United States Patent
Sheedy

Patent Number: 5,230,569
Date of Patent: Jul. 27, 1993

[54] BEARING ASSEMBLIES

[75] Inventor: Noel F. Sheedy, Doreen, Australia

[73] Assignee: Plastic Bearing & Housing Australasia PTY, Ltd., Doreen, Australia

[21] Appl. No.: 768,919

[22] PCT Filed: Mar. 5, 1991

[86] PCT No.: PCT/AU91/00072
§ 371 Date: Oct. 10, 1991
§ 102(e) Date: Oct. 10, 1991

[87] PCT Pub. No.: WO91/14107
PCT Pub. Date: Sep. 19, 1991

[30] Foreign Application Priority Data

Mar. 8, 1990 [AU] Australia ............... PJ9005
Mar. 16, 1990 [AU] Australia ............... PJ9154
Jul. 18, 1990 [AU] Australia ............... PK1226

[51] Int. Cl.$^5$ .................................. F16C 33/02
[52] U.S. Cl. ......................... 384/276; 384/58; 384/296; 384/416
[58] Field of Search ............ 384/50, 58, 52, 54, 384/275, 276, 296–300, 416–418, 901

[56] References Cited

U.S. PATENT DOCUMENTS

| 3,740,107 | 6/1973 | Fromme | 384/536 |
| 4,395,142 | 7/1983 | Lobeck | 384/300 X |
| 5,056,938 | 10/1991 | Ahlman et al. | 384/901 X |

FOREIGN PATENT DOCUMENTS

| 119721 | 3/1945 | Australia . | |
| 14986/76 | 11/1978 | Australia . | |
| 2541088 | 4/1989 | Australia . | |
| 2298188 | 1/1990 | Australia . | |
| 5974790 | 7/1990 | Australia . | |
| 5360790 | 8/1990 | Australia . | |
| 939717 | 2/1956 | Fed. Rep. of Germany . | |
| 622998 | 6/1927 | France | 384/276 |
| 567905 | 3/1945 | United Kingdom . | |
| 930283 | 7/1963 | United Kingdom | 384/901 |
| 976698 | 12/1964 | United Kingdom | 384/50 |

Primary Examiner—Thomas R. Hannon

[57] ABSTRACT

The invention relates to a bearing for a shaft comprising a first bearing member mountable on the shaft to be fixed thereto, and a second bearing member rotatably mountable about the coaxial with the first bearing member to define at least two annular bush receiving recesses, wherein the two or more annular bush receiving recesses are at least partially separated by at least one internal locating projection projecting from either the first or the second bearing member, and at least two annular bush members locatable one in each of the bush receiving recesses each said annular bush membering being adapted to dissipate heat during operation of the bearing by oscillating between a condition in which the annular bush member is stationary with respect to the first bearing member and rotatable with respect to the second bearing member is stationary with respect to the second bearing member and rotatable with respect to the first bearing member.

22 Claims, 10 Drawing Sheets

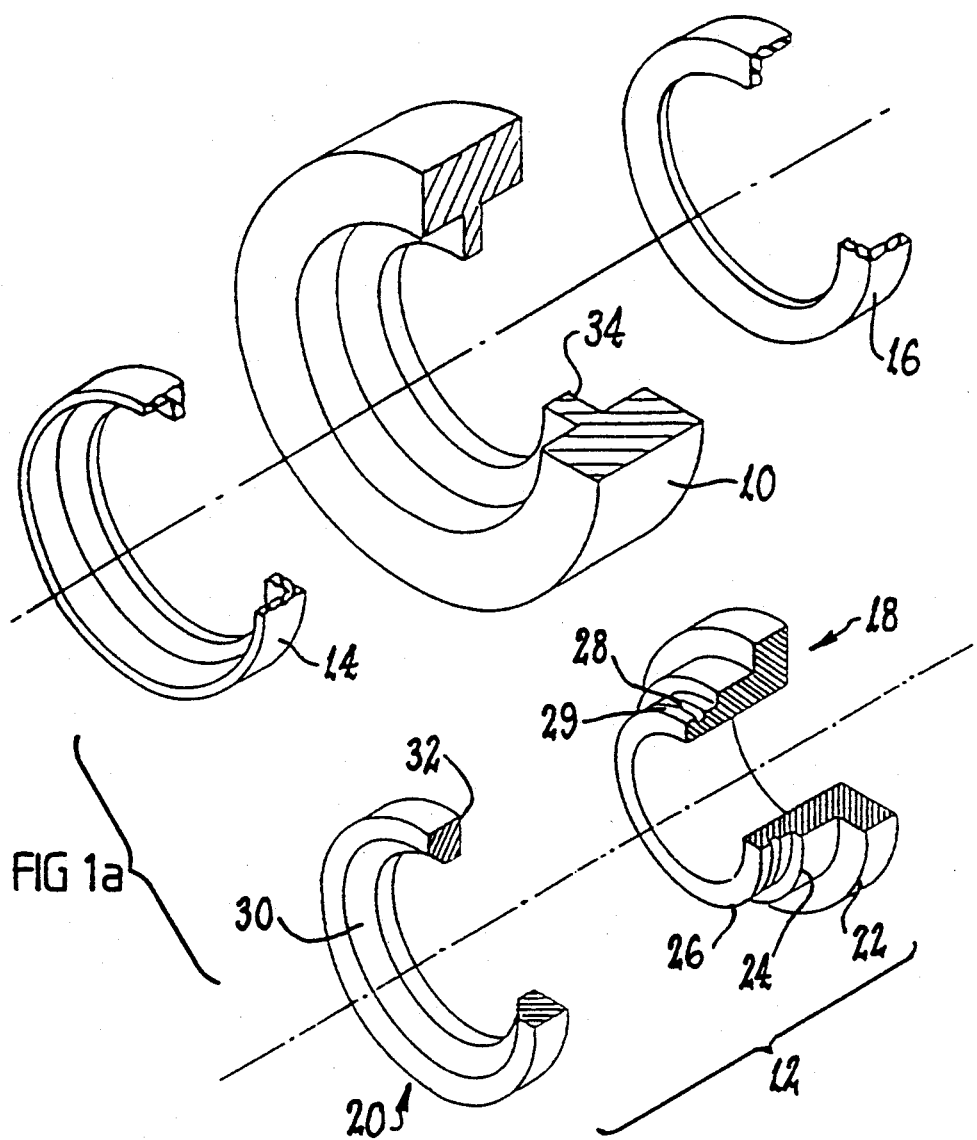
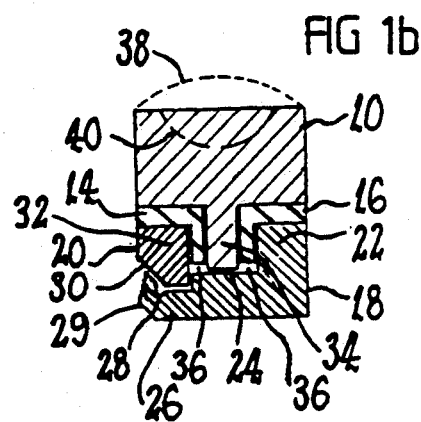

BEARING ASSEMBLIES

The present invention relates generally to bearings and bearing assemblies. More particularly the present invention relates to bearings having complementary mating surfaces, such as for example a male and female arrangement for locating one bearing member with respect to another bearing member, and which are a substitute for conventional ball or roller bearings.

Conventional ball or roller bearings in their many and varied forms usually consist of an inner race member which is fixedly located to a rotatable shaft, so as to rotate in accordance with corresponding rotation of the shaft, an outer race member which is fixed to a stationary element, and balls or rollers held in position by a cage or flanges or the like located between the inner and outer race members. The balls or rollers provide relative rotation of the inner and outer race members with respect to each other. Usually, the side of the ball bearing or roller bearing presents cavities or depressions because of the wavy shape of the cage surrounding the balls or rollers.

It is an object of the invention to provide an improved bearing which at least partially overcomes problems with known bearings.

According to the present invention there is provided a bearing for a shaft, said bearing comprising a first bearing member mountable on the shaft to be fixed thereto, and a second bearing member mountable about and coaxial with the first bearing member to define at least two annular bush receiving recesses, wherein said two or more annular bush receiving recesses are at least partially separated by at least one internal locating means projecting from either of the first or the second bearing member, and wherein a bush member is locatable one in each of the bush receiving recesses to be rotatable with respect to each of the first and second bearing members. Means to retain the bush members in the bush receiving recesses is also provided.

The second bearing member of the present invention is preferably an annular outer race and is preferably rotatably mountable about and coaxial with the first bearing member. The internal locating means may be at least one radially inwardly directed annular flange integral with the outer race. Alternatively, the internal locating means may be a discontinuous flange formed by a plurality of angularly spaced tabs or the like. Typically, the flange may be any of square, rectangular, curved, dovetailed or the like in cross-section or it may have any suitable desirable or convenient section or combination of sections. Additionally, heat dissipation means may be provided on the flange, such as fins, flutes, threads or the like. Other forms of heat dissipating means are spiral or helical grooves, or ridging, in the side surfaces of the flange. The depth of the helical or spiral groove or ridging may be very small compared to the height of the flange.

In another form, there may be two or more flanges defining a corresponding number of bush receiving recesses between the first and second bearing members. Where more than a single flange is provided, the flanges may be of the same thickness and profile or may be of different thickness and different profiles. Preferably, the flange is a paired or double flange, each flange being spaced apart from the other. Further, the flange may extend to any width relative to the width of the outer race, from being almost the width of the outer race, to being a very thin lip.

Of course a person skilled in the art will understand that the internal locating means may also be at least one radially outwardly directed annular flange integral with, and projecting from, the first bearing member. While specific embodiments of this variation will not be described, the following configurations described for an inwardly projecting flange may be modified as necessary to accomodate this variation, and these modifications will be clear to the person skilled in the art.

The first bearing member of the present invention most preferably includes an annular inner race and a thrust collar. The annular inner race may define a bore for receiving a shaft or the like. Alternatively, the inner race may be an inner race stud to form a cam follower or the like. The inner race and the thrust collar together may define an inner race shoulder and a thrust collar shoulder respectively. The inner race is preferably locatable within the outer race so that the inner race shoulder is in face-to-face relationship with one side of the flange of the outer race to define one bush receiving recess. The thrust collar is preferably connectable to a part of the inner race which projects through the outer race, to be locatable so that the thrust collar shoulder is in face-to-face relationship with the other side of the flange to define a second bush receiving recess. Therefore, when located in place, the thrust collar and the inner race together define an annular groove in which the flange of the outer race is received.

In this form, one bush member is preferably located between the thrust collar shoulder and the outer race, and another bush member is preferably located between the inner race shoulder and the outer race. The two bush members are physically separated by the annular flange of the outer race, and define respective bearing surfaces between shoulder and bush, and bush and flange. For ease of reference, the bearing surfaces will be referred to as a flange bearing surface and a shoulder bearing surface, with respect to either the thrust collar or the inner race.

The annular flange of the outer race may have a rectangular cross-section and the shoulders of the thrust collar and inner race are then correspondingly of a right-angle cross-section. In this form the bush members are of a complementary shape, such as an L-section, to be received in a snug-fitting relationship within respective bush receiving recesses by the respective shoulders and also by the flange of the outer race. The groove formed is complementary to the shape of the flange within fine tolerances since the flange must be capable of rotating in the groove, as must be the bush members.

The inner race may thus consist of three axially adjacent annular portions, where the first and largest diameter portion defines the inner race shoulder, the second portion defines the bottom wall of the groove formed by the inner race and the thrust collar, and the third, and smallest diameter portion provides means to retain the bush members, and for connection of the inner race to the thrust collar.

Further, the bush members may be split axially or at an angle to the axis of rotation in order to provide bearing shells. Thus, the bush members may be annular or may be semi-circular or the like.

Similarly, the bore of the inner race may also be of any cross-section, such as circular, square, hexagonal, D-shaped, splined or any combination of these, again depending on requirements. The bore may even be tapered axially. Of course, the bearing surfaces of the bearing must be circular such that rotation is allowed.

The means to retain the bush members and to connect the inner race to the thrust collar may be provided by a shallow annular groove about the external periphery of the third portion of the inner race. The groove is preferably located so that the third portion extends far enough beyond the thrust collar to allow the part of the third portion beyond the groove to be flared over the outside of the thrust collar, to hold the thrust collar in place. The flaring may be done by any suitable tool and preferably the thrust collar has a slight chamfer on its external end surface over which the third portion of the inner race may be flared, so that the inner race does not project beyond that external surface. Of course, the internal end surface of the thrust collar preferably includes a recess which at least partially receives a part of the second portion of the inner race to suitably define the thrust collar shoulder.

In another form, the flange of the outer race extends across substantially all of the axial width of the outer race. The inner race then has a relatively thin holding flange extending peripherally thereabout to partially define one bush receiving recess between it and a corresponding shoulder of the outer race flange. The thrust collar is similarly configured to include a relatively thin holding flange and to define a second bush receiving recess between it and the other shoulder of the outer race flange. In this form, the bush members are also of an L-section, but are located in the respective bush receiving recesses so as to together provide a substantially U-shaped (in cross-section) barrier between the outer race and the inner race and thrust collar. The means to retain the bush members and to connect the inner race to the thrust collar may of course be similar to that described above.

In another form, the means to retain the bush members and to connect the inner race to the thrust collar may be a threaded third portion on the inner race which is suitable to engage a correspondingly threaded thrust collar. In this form, the thrust collar may also include an additional annular flange having a bore corresponding to the inner race bore, and having a threaded radial aperture therethrough to receive a grub screw or the like. Alternatively, the additional flange may engage an annular eccentric collar, itself having an aperture capable of receiving a grub screw or the like. The grub screw provides additional securement of the bearing of the present invention to a shaft or the like located in the bore thereof. In another alternative form, the inner race may comprise an integral fourth portion, adjacent to the first portion mentioned above and of a similar diameter to the third portion, in the form of an additional flange. This additional flange may also have an aperture therein suitable to receive a grub screw or the like, for securing the bearing of the present invention to a shaft or the like.

The present invention also provides a conveyor roller having an elongate first bearing member and including a second bearing member in the form of two spaced apart outer races rotatably engaged one at each end thereof to define at least four bush receiving recesses, each of said spaced apart outer races having at least one internal locating means projecting inwardly thereof to at least partially separate a respective two bush receiving recesses, said conveyor roller also including a bush member locatable one in each of said bush receiving recesses to be rotatable with respect to each of the first and second bearing members.

In this preferred form of the invention the second bearing member includes two spaced apart outer races. Preferably, the internal locating means of each outer race is an inwardly projecting flange which together defines four bush receiving recesses between the first and second bearing members. In this form, the first bearing member includes an elongate annular inner race adapted at each end to engage with respective thrust collars. Preferably, the thrust collars and the ends of the elongate inner race are configured and engage in a manner similar to that described above. Of couse, the elongate inner race is adapted to receive two outer races and two thrust collars, and so is not precisely the same in overall configuration as the inner race described above.

Another form of a roller in which the bearing of the present invention is useful is a roller having an elongate cylindrical body adapted to be secured at at least one end thereof to the outer race of a bearing so as to be capable of rotation therewith about the axis of the bearing. Preferably a second bearing is secured to the other end of the body, and additional bearings may be located along the length and within the body to provide extra support. Each bearing is of course adapted to receive a shaft therethrough, such as a free-floating shaft, a spring-loaded shaft a fixed shaft or any other type of shaft, such that the roller may be rotated thereabout.

The roller of this form has many and varied uses, such as a conveyor roller, a pressure roller for a lawn mower or the like, roller mounts for a bicycle support and exercise machine, wheels for fork-lift vehicles or the like, or even in such simple uses as a domestic kitchen roller or in a bakery or the like as an industrial roller. In these latter uses, the body of the roller may have an external surface which is patterned or which is at least other than a smooth surface finish. These examples are of course not to be taken as limiting.

The bearing of the present invention may also be particularly beneficially used as wheel bearings for any type of vehicle, such as motor cars, motor cycles, tractors, bicycles, and trucks or the like, and also trailers of any type such as caravans, and boat or car trailers or the like. The bearing of the present invention may also be used directly as a wheel, as a surface levelling or finishing roller, or as any other form of a direct load carrying rolling member in a vehicle, agricultural implement or the like. The bearing of the present invention is not to be limited to any of these particular applications.

This invention also relates generally to substitutes for or replacements for roller bearings and the like, which are adapted to replace, or are interchangeable with, conventional steel-type track cam followers which use roller or needle type bearings. Therefore, a further modification to the bearing of the present invention is a cam follower wherein the first bearing means comprises an inner race stud together with a thrust collar. The inner race stud is similar to a conventional bolt, having a head, an axially adjacent locating shaft portion and a threaded shaft portion axially adjacent to the locating shaft. Those three parts conform to the three preferred portions of the inner race referred to above, in that the head defines the inner race stud shoulder, the locating shaft defines the bottom wall of the groove defined by the thrust collar and the head, while the threaded shaft is suitable for securing the bearing itself to a second member. The thrust collar may take the form of an annular washer or the like, while still defining the thrust collar shoulder.

It will also be understood by a person skilled in the art that the external surface of the bearing, or more particularly the external circumferential surface of the outer race, may be of any cross-section. The surface may be flat, convexly or concavely curved, conical or frustoconical, or any combinations of shapes, dependent upon specific requirements. For example, the outer race may be substantially rectangular so that the bearing itself may be easily rigidly secured to another member as required.

The bush members of the present invention are preferably fabricated from a thermoplastic polyester resin and the inner and outer races are preferably made from a corrosion proof metal such as stainless steel or the like (although other metals should not be excluded) and more preferably are coated with a hard material such as a titanium nitride or ceramic coating or the like. Additionally, all of the components may be made of plastics material, such as the outer race, the bush members, the inner race, and the thrust collar. However, the outer and inner race may be made of synthetic polymeric material, which, together with the thrust collar, at least partially enclose bush members made from a corrosion proof metal or other metals which may be coated as above.

The bush members may be fabricated or moulded from a synthetic polymeric material or materials, such as an unreinforced, partially crystalline, thermoplastic polyester, for example polyethylene terephthalate. However, materials from which the components of the present invention may be made include plastics, ceramics, glass, pure carbons, carbon fibres, graphite impregnated materials, kevlar, phosphorous bronze or the like and may include combinations thereof. It will be understood by a person skilled in the art that the selection of a particular material will be dependent upon the particular application required of the bearing. For instance, where the bearing is being used in a corrosive atmosphere due to the presence of a particular type of chemical, a material would be selected that was resistant to that type of corrosion. Similarly, if metals are used in the bearing, then the same considerations would apply. For instance, if rusting was not perceived to be a problem, mild steel may be used. Alternatively, 316 stainless steel may be used, or, for applications having a lighter load, 410 stainless steel may be used. As discussed earlier, any combination of metal and plastics etc. may be used or entirely plastics or entirely metal may be used.

Some examples of practical arrangements of the invention will now be described with reference to the accompanying drawings. However, it is to be understood that the following description in no way limits the generality of the invention as described above.

In the drawings:

FIG. 1a is a partial perspective view of the components of a first embodiment of the bearing of the present invention;

FIG. 1b is a cross-sectional view of the embodiment of FIG. 1a;

FIG. 2b is a cross-sectional view of the embodiment of FIG. 2a;

FIG. 3b is a cross-sectional view of the embodiment of FIG. 3a;

FIG. 4b is a cross-sectional view of the embodiment of FIG. 4a;

FIG. 5b is a cross-sectional view of the embodiment of FIG. 5a;

FIG. 6b is a cross-sectional view of the embodiment of FIG. 6a;

FIG. 7b is a cross-sectional view of the embodiment of FIG. 7a;

FIG. 8b is a cross-sectional view of the embodiment of FIG. 8a;

FIG. 10b is a cross-sectional view of the embodiment of FIG. 10a;

Figure 2A:
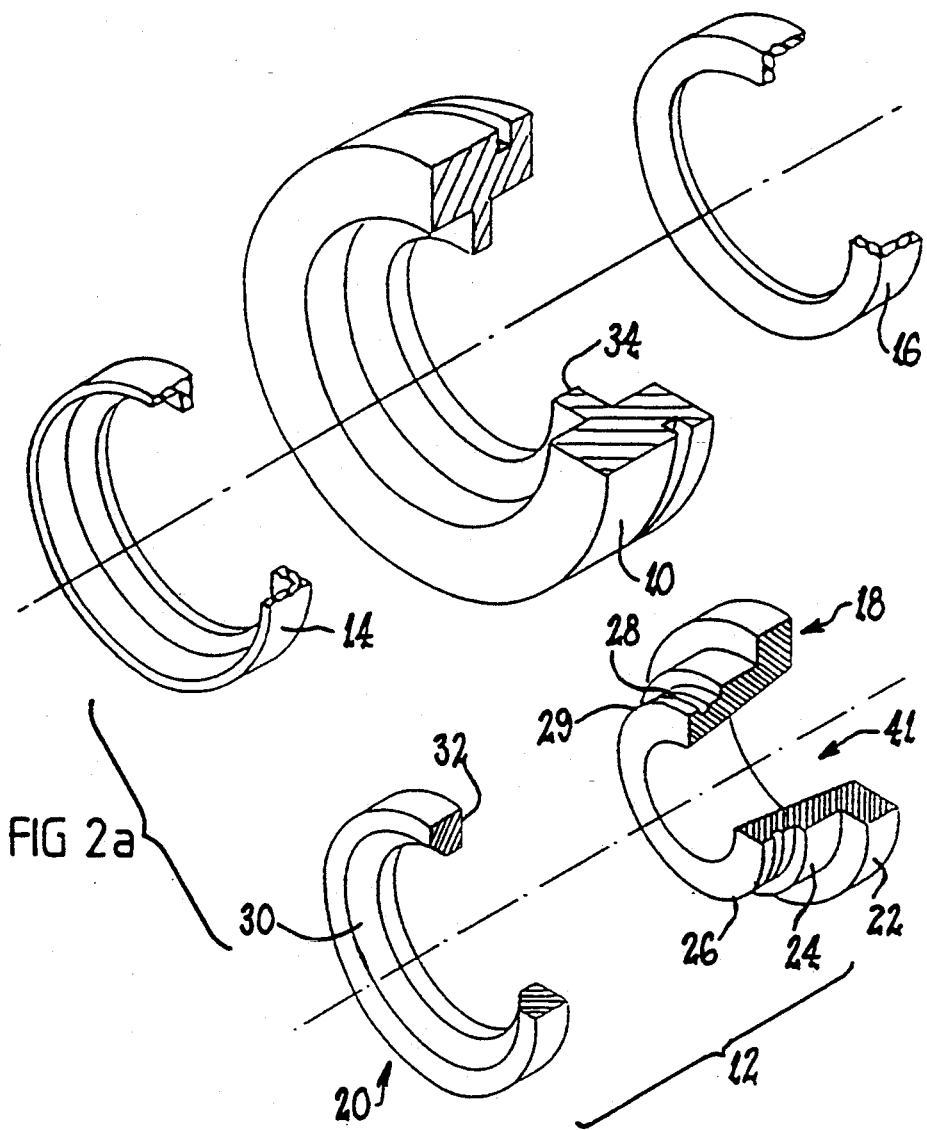
FIG. 2a is a partial perspective view of the components of a second embodiment.

Illustrated in FIGS. 1a and 1b are the components of a bearing according to the present invention shown both separated and together when in use. Illustrated is an annular second bearing member 10, an annular first bearing member 12 and two annular bush members 14 and 16. First bearing member 12 comprises an inner race 18 and a thrust collar 20. Inner race 18 has a first portion 22 defining a shoulder, a second portion 24 and a third portion 26. Third portion 26 includes an annular groove 28 so that when third portion 26 is received within thrust collar 20 the part 29 beyond groove 28 may be forcibly flared over the chamfer 30 of thrust collar 20 to retain the thrust collar in place. Thrust collar 20 also defines a shoulder 32.

Second bearing member 10 is an outer race having a flange 34 with a generally rectangular cross-section. As shown in FIG. 1b, shoulders 32 and 22 together define a groove which receives flange 34, and a part of each of bush members 14 and 16. The substantial L-shape of bush members 14 and 16 provides bearing surfaces between shoulder 22 and bush 16, bush 16 and flange 34 and member 10, and between flange 34 and member 10 and bush 14, and bush 14 and shoulder 32.

Each of the components of the bearing are machined or formed to very close tolerances. However, due to imperfections in machining and other methods of formation it may be preferred to apply a lubricant between each of the bearing surfaces, to additionally ease the effects of friction. Gaps 36 are provided as reservoirs for excess or run-off lubricant. Any suitable lubricant may be used. Alternatively, a coating of a material such as titanium nitride or ceramic may be applied, to increase the surface hardness of the metal components. Gold has also been successfully used.

Illustrated by broken lines 38 and 40 are possible alternative configurations for the external circumferential surface of member 10. As described earlier a range of surface configurations may be used as required.

Figure 2B:
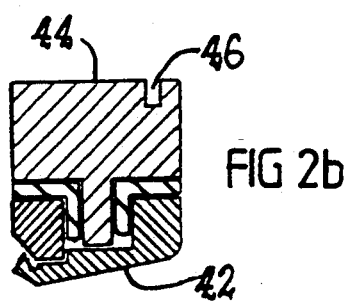

Illustrated in FIGS. 2a and 2b is a second embodiment of the present invention, where like features have been given like reference numerals with respect to FIGS. 1a and 1b. Indeed, in each of the remaining Figures the same features will be similarly referenced.

Two differences are evident over the embodiment of FIGS. 1a and 1b, which serve to illustrate the wholly prefered nature of the configuration of both the external circumferential surface 44 of member 10 and the cross-sectional shape of the bore 41 of inner race 18. Bore 41 is here shown having a taper 42 over its full axial length and surface 44 has a groove 46 therein which may be used to assist in securing the bearing to a second member (not shown).

Figure 3A:
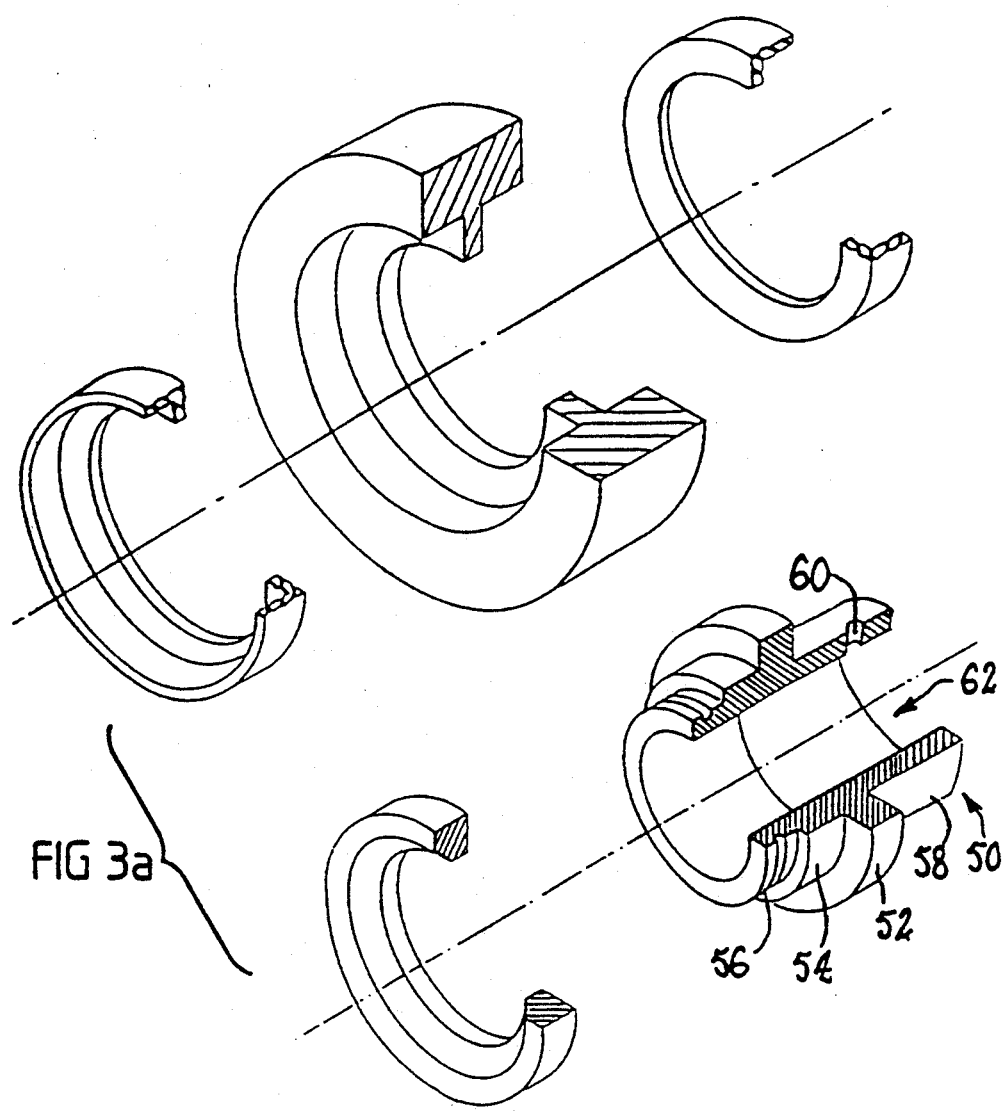
FIG. 3a is a partial perspective view of the components of a third embodiment.
Figure 3B:
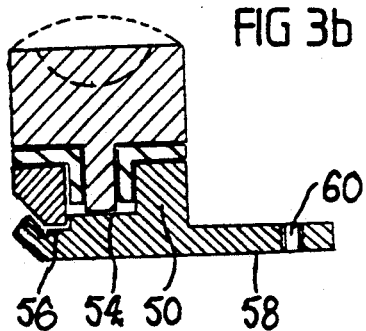

FIGS. 3a and 3b illustrate a variation of an inner race 50. Inner race 50 has a first portion 52, a second portion 54 and a third portion 56, similar to the first, second and third portions of race 18 illustrated in FIGS. 1a and 1b, and 2a and 2b, but also has a fourth portion 58 having a threaded radial aperture 60. Aperture 60 is suitable to receive a grub screw or the like to secure inner race (and hence the entire bearing when assembled) to a shaft or the like inserted through bore 62.

Figure 4A:
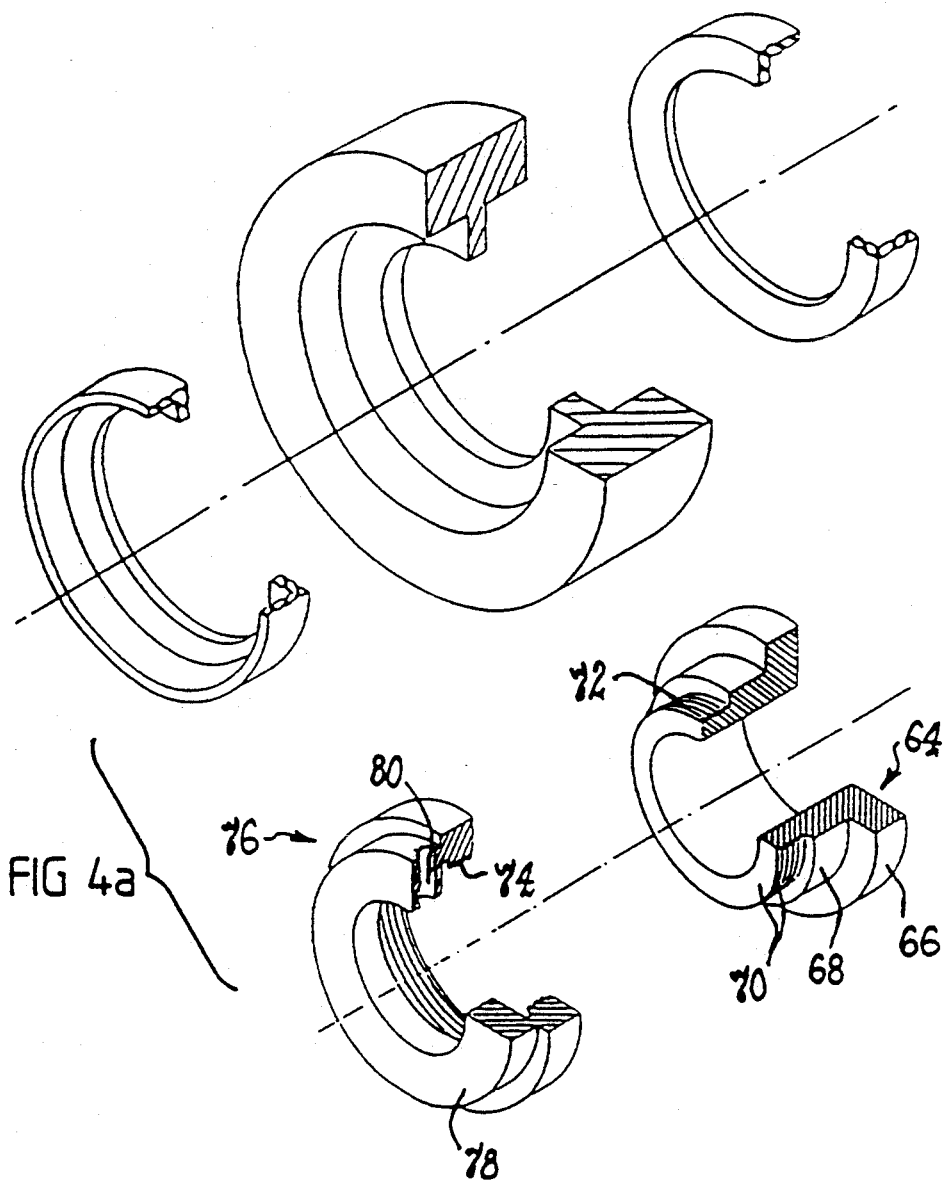
FIG. 4a is a partial perspective view of the components of a fourth embodiment.
Figure 4B:
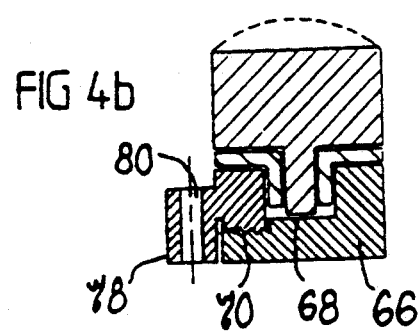

FIGS. 4a and 4b illustrate yet another variation of an inner race 64. Inner race 64 again has three portions, 66, 68 and 70, but third portion 70 is threaded on its external circumferential surface 72 to engage with a corresponding threaded surface 74 on thrust collar 76. Thrust collar 76 also has an additional flange 78 which includes an aperture 80 which may receive a grub screw or the like to secure the bearing to a shaft.

Figure 5A:
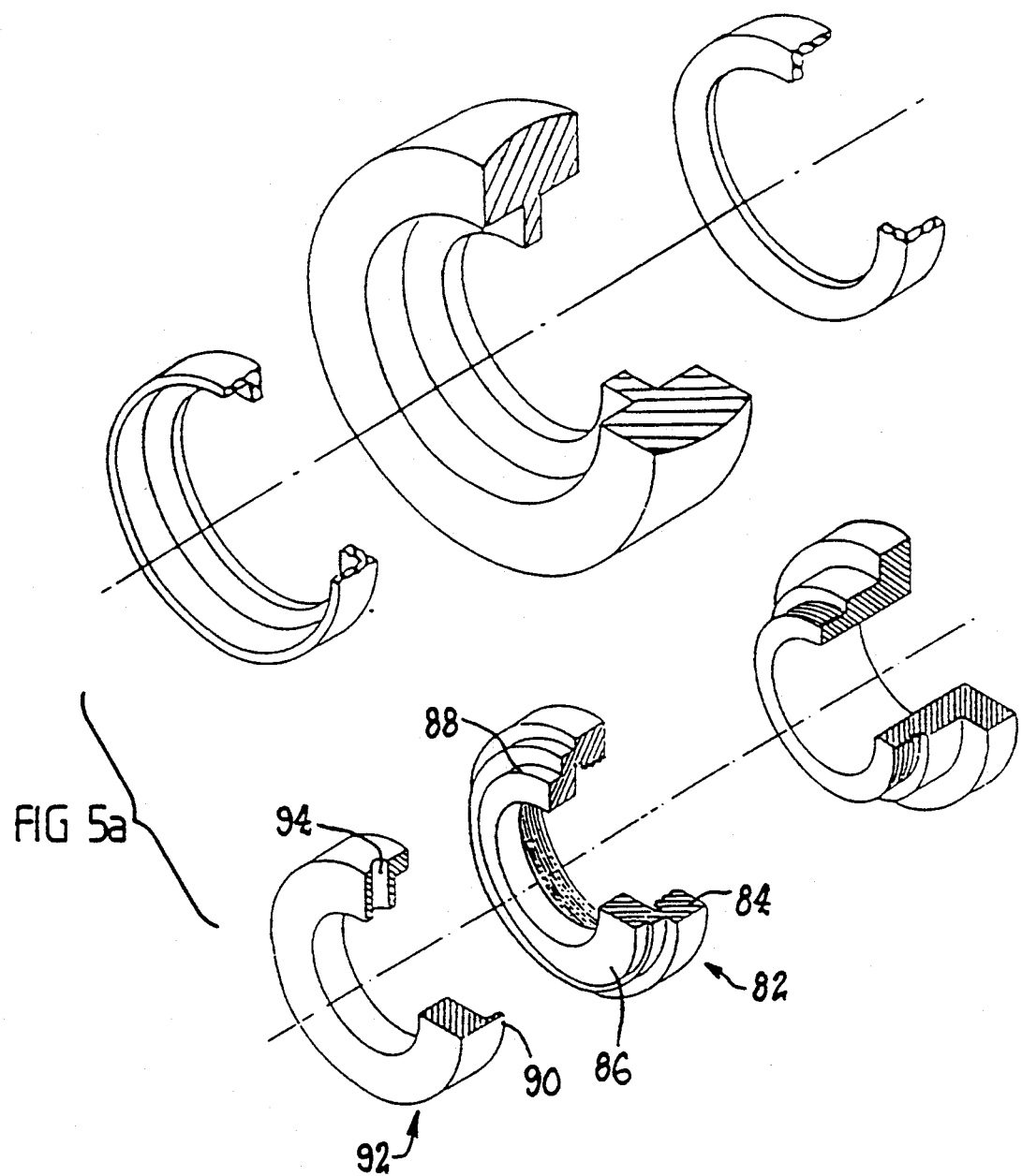
FIG. 5a is a partial perspective view of the components of a fifth embodiment.
Figure 5B:
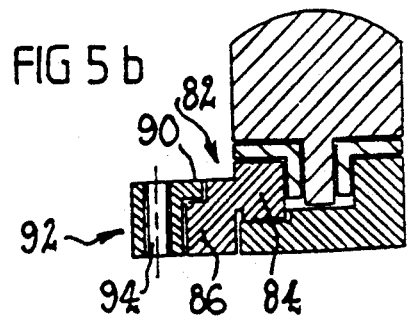

FIGS. 5a and 5b illustrate a variation of the thrust collar illustrated in FIGS. 4a and 4b. Thrust collar 82 has a threaded portion 84 and an abutting portion 86. Abutting portion 86 has a recess 88 therein to at least partially receive the annular lip 90 of eccentric collar 92. Eccentric collar 92 has a threaded aperture 94 similar to the threaded aperture 80 of FIGS. 4a and 4b.

Figure 6A:
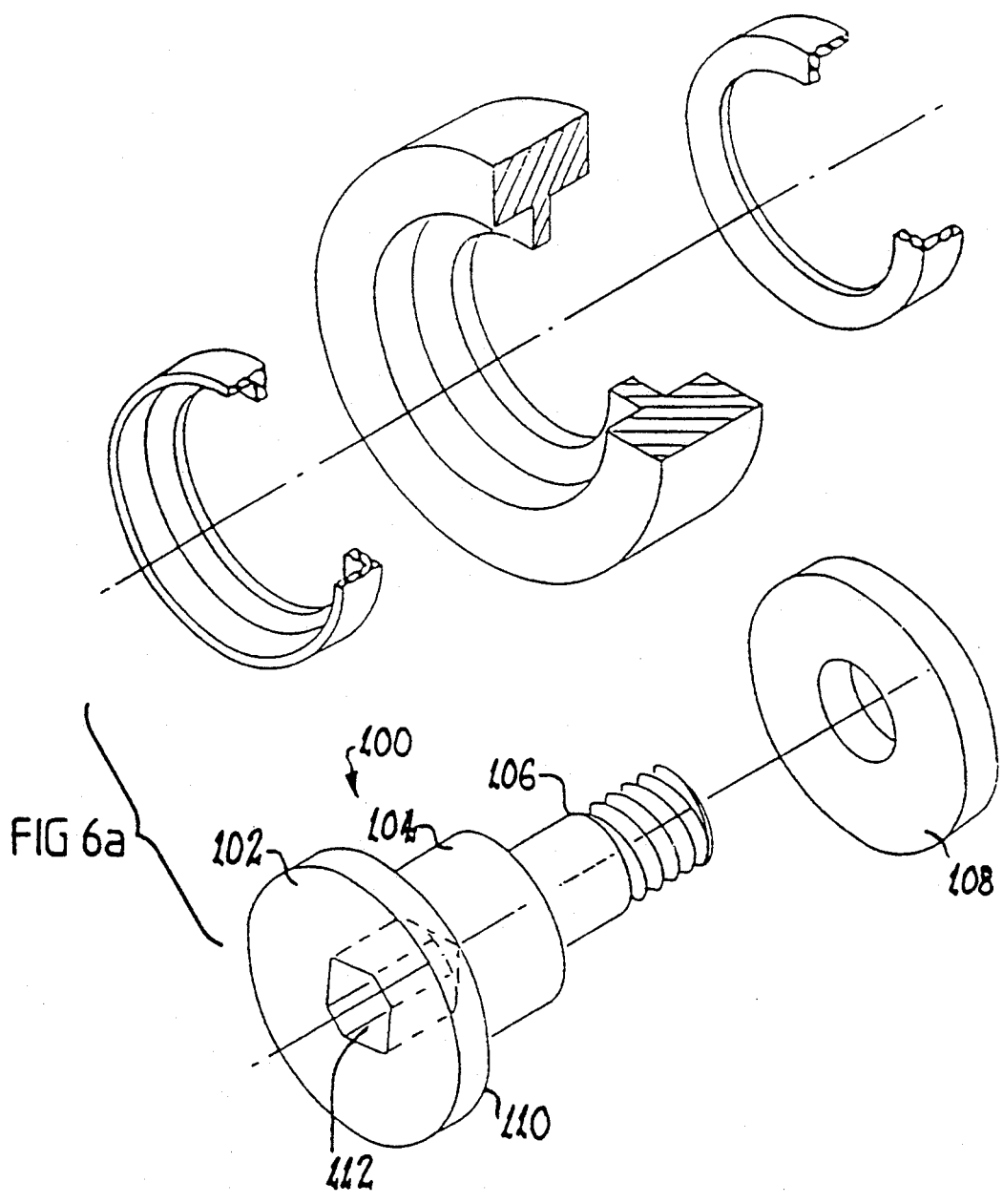
FIG. 6a is a partial perspective view of the components of a sixth embodiment.
Figure 6B:
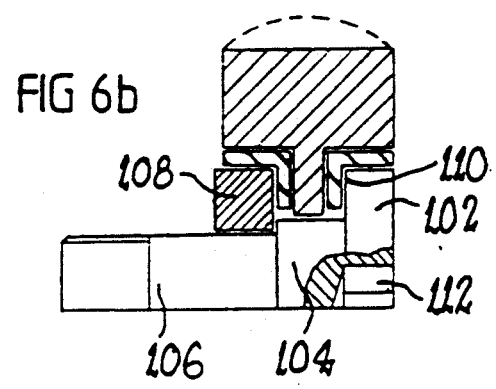

Illustrated in FIGS. 6a and 6b is a bearing having an inner race stud 100 in place of the inner races of earlier Figures which each had respective bores. Stud 100 is in the form of a standard bolt, having a head 102, a locating shaft portion 104 and a threaded shaft portion 106. Thrust collar 108 is in the form of a standard washer or the like. In this embodiment, head 102 defines a shoulder 110 to provide the respective bearing surfaces and has a hexagonal aperture 112 therein to facilitate locking. Alternatively, aperture 112 may be replaced by a standard groove or star for use with standard screwdrivers. The threaded portion 106 of stud 100 may then be used to secure the bearing as required.

Figure 7A:
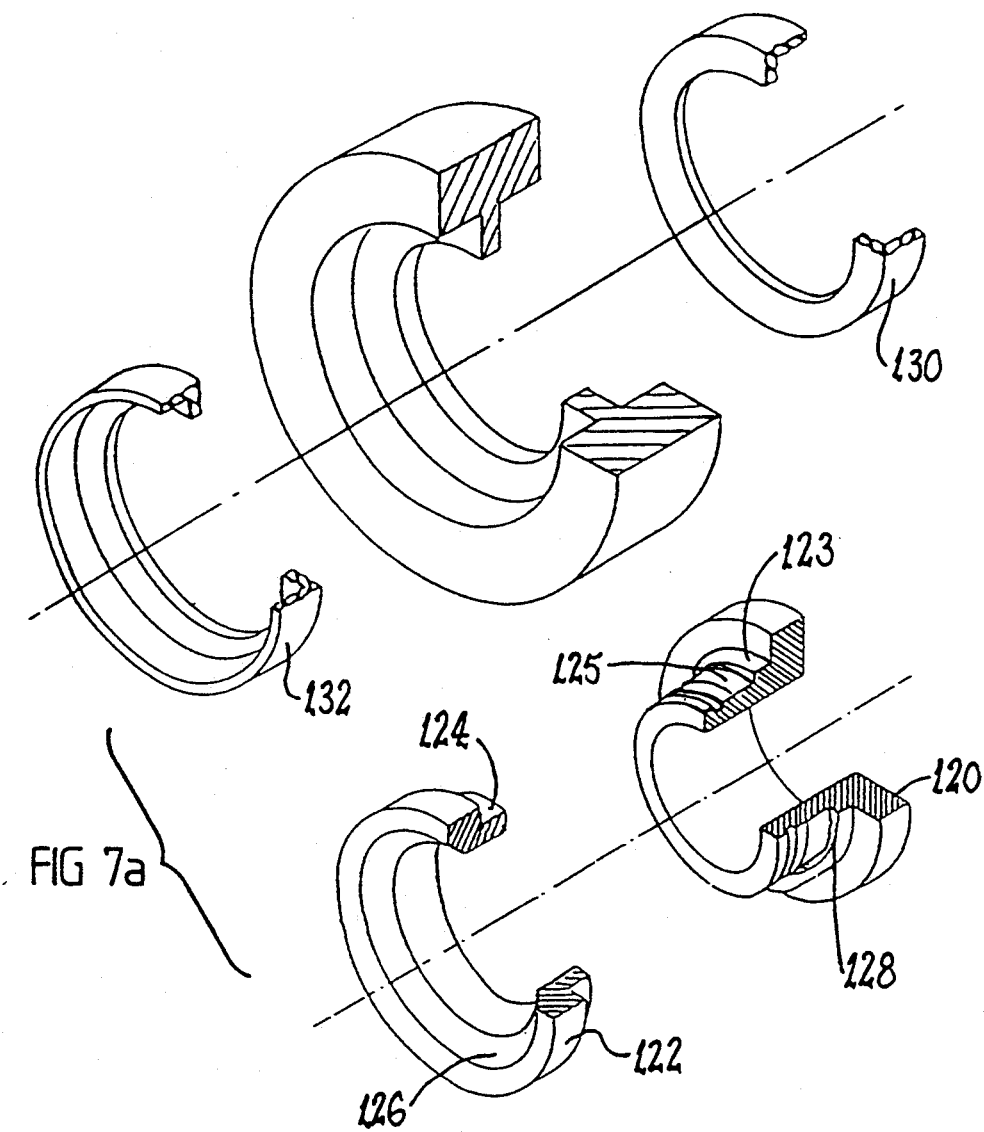
FIG. 7a is a partial perspective view of the components of a seventh embodiment.
Figure 7B:
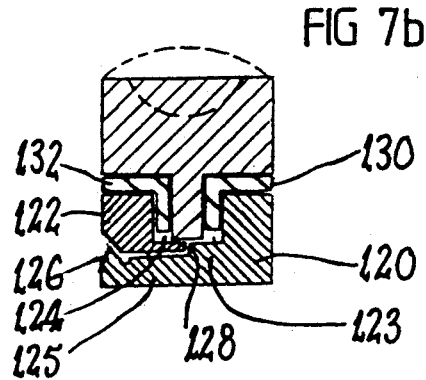

Illustrated in FIGS. 7a and 7b is yet another preferred embodiment of a bearing according to the present invention. Illustrated is a bearing having an inner race 120 and a thrust collar 122. Inner race 120 is modified slightly over previously described inner races in that second portion 123 is smaller in axial length and third portion 125 is correspondingly larger in axial length. Thrust collar 122 includes a flange 124 projecting away from chamfer 126 to locate within third portion 125 when assembled and to abut shoulder 128 defined by the second and third portions. This arrangement is particularly preferred for bearings of a small size, due to the difficulty in providing such small recesses to receive the annular bush members 130 and 132.

Figure 8A:
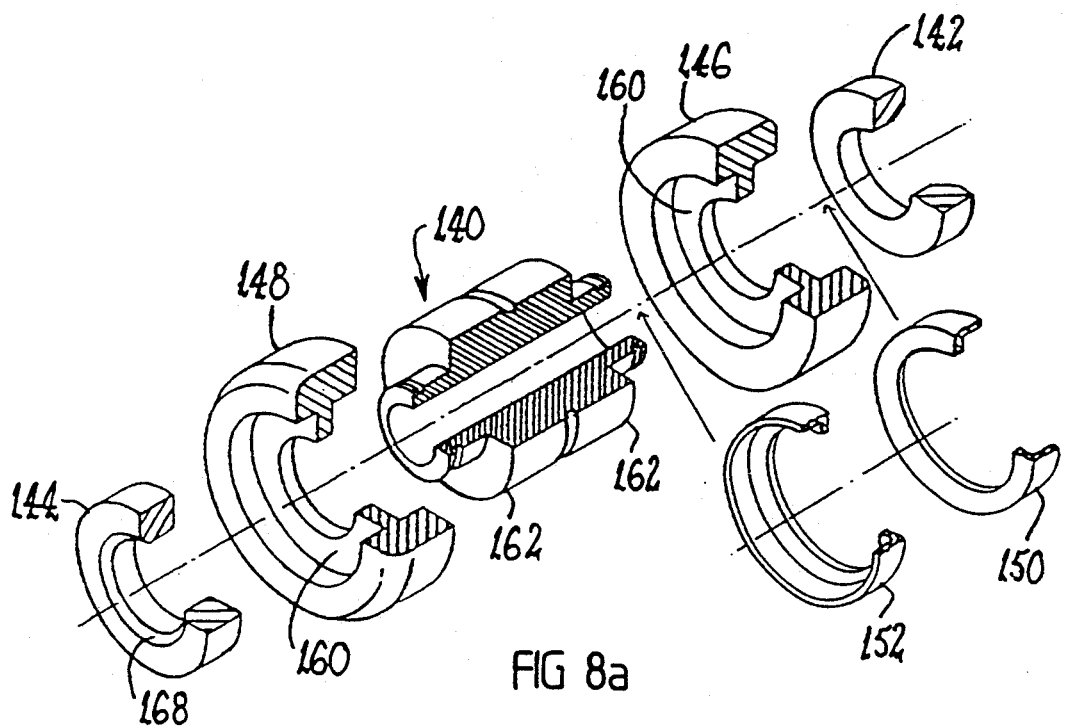
FIG. 8a is a partial perspective view of the components of an eigth embodiment.
Figure 8B:
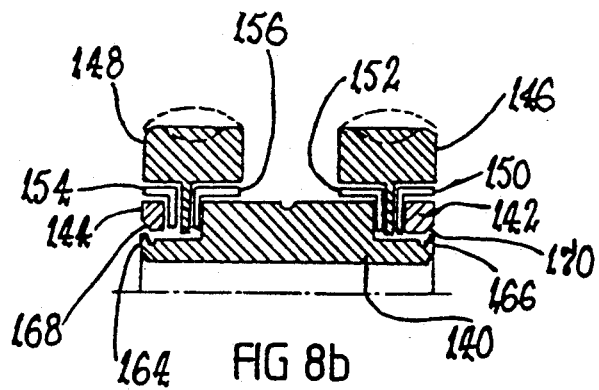

Illustrated in FIGS. 8a and 8b is yet another preferred embodiment of a bearing according to the present invention. Illustrated is a bearing having an inner race 140 and thrust collars 142 and 144, together with two spaced apart outer races 146 and 148. Annular bush members 150 and 152 are located within the recesses provided between collar 142 and outer race 146, and inner race 140 and outer race 146. Similar annular bush members 154 and 156 (which have not been illustrated in FIG. 8a but are illustrated in FIG. 8b) are located within the recesses provided between collar 144 and outer race 148, and inner race 140 and outer race 148.

Outer races 146 and 148 include flanges 160 respectively extending radially inwardly therefrom and being of a generally rectangular cross-section. As shown in FIG. 8b, flanges define the recesses, which receive the respective annular bush members, with collars 142 and 144 and shoulders 162 of inner race 140.

Collars 142 and 144 may be retained in place by flaring ends 164 and 166 over respective chambers 168 and 170, similar to the embodiment illustrated in FIGS. 1a and 1b.

The embodiment illustrated in FIGS. 8a and 8b may be used in many ways. In particular, a preferred use has been found to be with conveyor systems, such as indoor conveyor systems in the food industry or the like. For example, overhead conveyors which carry a load from one location to another comprise rollers which support the load and which are carried by a suitably configured rail or the like.

Figure 9A:
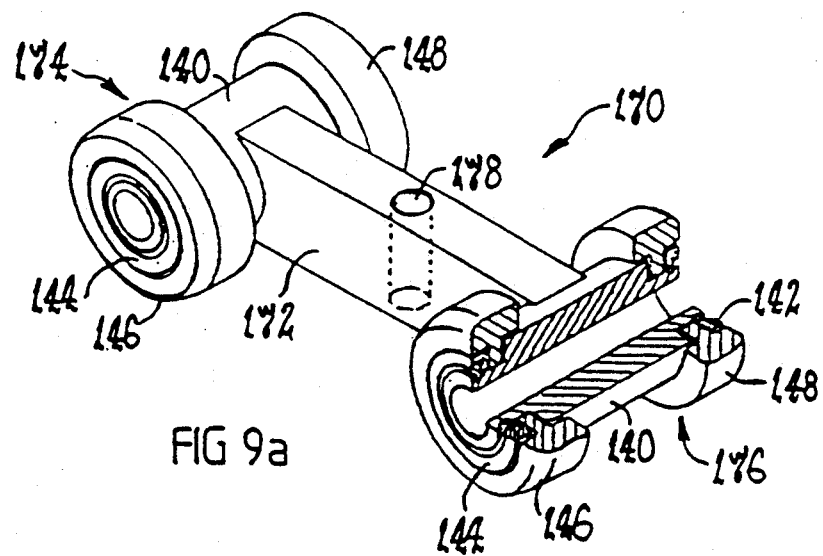
FIGS. 9a and 9b are perspective views of the embodiment of FIG. 8a in use.
Figure 9B:
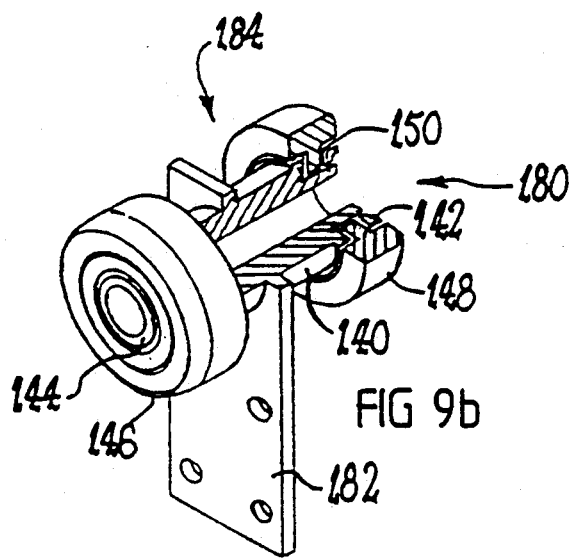

FIGS. 9a and 9b illustrate two possible versions of a roller having bearings according to the present invention. Illustrated in FIG. 9a is a roller 170 having an arm 172 connecting two bearings 174 and 176. Bearings 174 and 176 are as shown in FIGS. 8a and 8b, and utilise similar reference numerals. Roller 170 also has provision for receiving a load or a load bearing member, by way of aperture 178. In this form, the outer races 146 and 148 contact a rail or the like (not shown) allowing movement of the roller therealong. FIGS. 9a and 9b are of course illustrative only and are not to be limiting of the bearing assembly or of loads applied thereto and in particular are not to limit those to be in any single geometric plane. The manner and position of attachment is also variable.

FIG. 9b illustrates a second version in the form of a single bearing according to the embodiment of the invention illustrated in FIGS. 8a and 8b. Roller 180 comprises a support bracket 182 secured to a bearing 184 (again, similar to the bearings in FIGS. 8a and 8b), at an appropriate point or near or about the centre of inner race 140. In this form a load is supported from or by bracket 182, and outer races 146 and 148 contact a rail or the like allowing movement therealong.

Figure 10A:
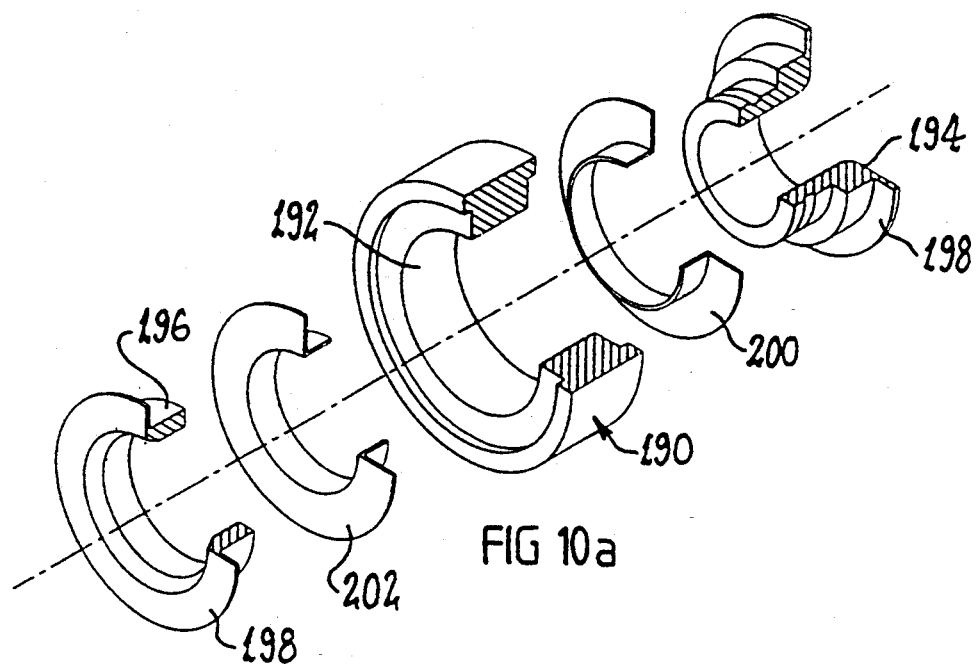
FIG. 10a is a partial perspective view of the components of a ninth embodiment.
Figure 10B:
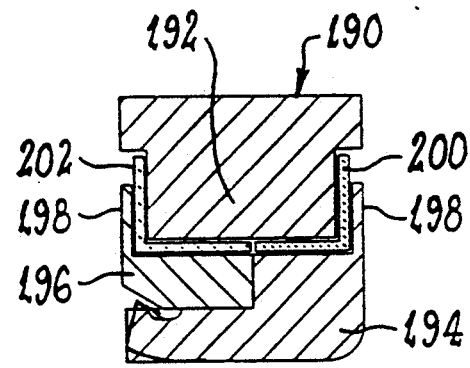

FIGS. 10a and 10b illustrate yet another preferred embodiment of a bearing according to the present invention. Illustrated is an outer race 190 having a flange 192 which extends across substantially the entire axial width thereof. Inner race 194 and thrust collar 196 each have a respective holding flange 198 which together with the remaining portions of the inner race and the thrust collar, and together with the flange 192 of the outer race 190, define a substantially U-shaped recess (not numbered) therebetween for the location of two bush members 200 and 202.

Figure 11:
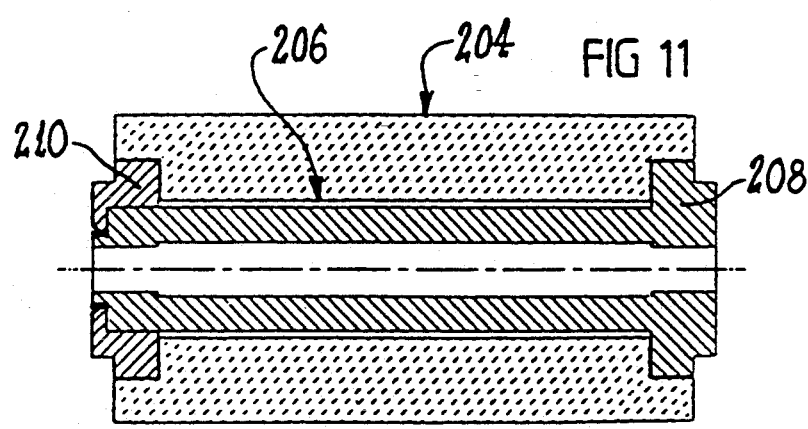
FIG. 11 is a cross-sectional view of an adapted version of the embodiment of FIGS. 10a and 10b.

An exaggerated version of the embodiment of FIGS. 10a and 10b is illustrated in FIG. 11 where an alternative type of roller is shown. Here the outer race 204 has been elongated and includes a wide annular flange 206 as its internal locating means. Inner race 208 is also elongated to define a substantially tubular first bearing, together with the thrust collar 210. FIG. 11 does not show the bush members which are located between the inner race 208 and the outer race 204 and the thrust collar 210 and the outer race 204.

As discussed earlier, an alternative to this type of roller is simply to provide a complete bearing at each end of an elongate cylindrical body (similar to outer race 204 in FIG. 11), such that the body is rigidly secured to the respective outer races of each bearing.

Rollers as illustrated in FIGS. 9a and 9b may be used in conveyor systems for transferring goods such as carcasses from one work station to another for various processing requirements. The use of conventional ball bearings has been found to provide various disadvantages, such as the wear in ball bearings producing or generating minute metal shavings which subsequently fall into food processing stations. Further, ball bearings have been found to easily break, thus requiring complete replacement and sometimes allowing ball bearings to fall into food processing stations.

Another advantage of the bearing of the present invention is that the bearing runs quieter than conventional all metal bearings. The reduction in noise is particularly apparent in situations where a large number of bearings are used, such as for example in indoor conveyor systems where each roller of the conveyor system has at least two bearings. The overall reduction in noise in enclosed environments is desirable because of the health and safety problems encountered when using large numbers of all metal bearings in confined spaces.

A further advantage resides in the male/female matingly engaging means of the bearing, which is used to locate the bush members with respect to each other and to provide an increase in bearing surface without increasing the external dimensions of the bearing assembly. Also, the bearing is resistant to corrosion, rust, contamination and the like because the external surfaces are relatively smooth and the internal locating means and bearing surfaces, being located internally within the bearing, are not exposed to the outside environment.

A major advantage of the bearing of the present invention is the ability to operate at high speeds and at elevated temperatures. Due to heat generated between the bearing surfaces of prior art devices, seizing was commonplace whenever high speeds were required. The present invention allows for dissipation of heat through the bush members "floating". While the precise physics of this is not fully understood, it is clear that when a bearing according to the present invention is in use the second bearing member (the outer race), rotates with respect the first bearing member (the inner race and thrust collar). Generally the bush members will rotate with respect to the outer race and also with respect to the inner race. Due to friction between the rotating parts there will be a generation of heat. Much of this will be dissipated but the temperature may increase to a level such that expansion and possibly adhesion of the bush members to either the inner or outer race causes the bush members to rotate with it. That is, the bush members will remain stationery with respect to one race, say the outer race, but rotate with respect to the other. This will allow for dissipation of heat in the area of contact between the bush members and the outer race, while heat is generated in the contact zone between the bush members and the inner race. During the time taken for the inner race to heat up sufficiently for it to engage or adhere to the bush members, the outer race will have cooled down sufficiently to disengage it from the bush members. Thus, the load will be transferred to the outer race, and the cyclic process will begin again. Such a "floating" behaviour allows for far greater speeds to be achieved without seizing of the bearing. For example, the bearing of the present invention has been tested successfully at speeds up to 2200 rpm, whereas known prior art bearings have been known to fail due to seizing at speeds as low as 150 rpm.

It has also been found that if the bush members are split axially or at an angle to the axis of rotation so that in a rest position there is a slight gap within the members, the bearing itself is capable of operating under greater temperatures due to the ability of the bush members to expand into the axial gap and thus avoid the seizing sometimes caused by expansion within the bush receiving recess.

A further advantage that arises is the ease with which the bearing of the present invention may be taken apart. This is due to the ability to apply a force to the thrust collar to bend back the flared-over lip of the inner race, and then replace, for example, the thrust collar, while merely re-flaring the inner race to reconnect. However, the embodiments of the present invention having the threaded thrust collar and inner race are clearly more preferred if ease of removal is considered particularly advantageous and desirous.

Those skilled in the art will appreciate that there may be many variations and modifications of the configuration described herein which are within the scope of the present invention.

The claims defining the invention are as follows:

1. A bearing for a shaft, said bearing comprising a first bearing member mountable on the shaft to be fixed thereto, and a second bearing member rotatably mountable about and coaxial with the first bearing member to define at least two annular bush receiving recesses, wherein said two or more annular bush receiving recesses are at least partially separated by at least one internal locating means projecting from either the first or the second bearing member, and at least two annular bush members locatable one in each of the bush receiving recesses each said annular bush member being adapted to dissipate heat during operation of said bearing by oscillating between a condition in which the annular bush member is stationary with respect to the first bearing member and rotatable with respect to the second bearing member and a condition in which the annular bush member is stationary with respect to the second bearing member and rotatable with respect to the first bearing member.

2. A bearing according to claim 1 wherein the second bearing member is an annular outer race and the internal locating means is at least one radially inwardly directed annular flange projecting radially inwardly of the second bearing member.

3. A bearing according to claim 1 for use as wheel bearings for any type of vehicle, or for use in conveyor systems.

4. A bearing according to claim 1 for use directly as a wheel, or as any other form of a direct load carrying rolling member.

5. A bearing according to claim 1, wherein the first bearing member includes an annular inner race and a thrust collar.

6. A bearing according to claim 5 wherein the inner race defines a bore for receiving a shaft.

7. A bearing according to claim 5 wherein the internal locating means is a wide flange extending substantially across the axial width of the second bearing member said first bearing member includes a wide annular groove capable of receiving the wide flange such that two bush receiving recesses are defined to form a single generally U-shaped bush receiving recess remaining between said first and second bearing members, and at least two bush members are locatable within the U-shaped bush receiving recess to be retained therein by respective peripherally extending holding flanges at each of the axially external faces of the first bearing member.

8. A bearing according to claim 5 wherein the bore of the inner race has a cross-sectional shape selected from the group consisting of circular, square, hexagonal, D-shaped and splined.

9. A bearing according to claim 5 wherein the thrust collar or the inner race includes an additional annular flange having a bore corresponding to the bore of the inner race, and having a threaded radial aperture therethrough to receive a grub screw or the like for securing the bearing to a shaft.

10. A bearing according to claim 5 wherein the inner race is an inner race stud in the form of a cam follower.

11. A bearing according to claim 5 wherein the inner race is locatable within the other race to form a shoulder on one side of the internal locating means and a thrust collar receiving opening on the other side, such that the shoulder is in face-to-face relationship with the internal locating means to form a first bush receiving recess, and the thrust collar is locatable within the said opening to be in face-to-face relationship with the internal locating means to form a second bush receiving recess, wherein the thrust collar and inner race together define an annular groove in which the internal locating means is received.

12. A bearing according to claim 11 wherein the thrust collar is connectable to that part of the inner race which extends beyond the internal locating means.

13. A bearing according to claim 11 wherein the inner race consists of three axially adjacent annular portions, where the first and largest diameter portion defines the shoulder, the second portion defines a bottom wall of the groove formed by the inner race and the thrust collar, and the third and smallest diameter portion provides means for connection of the inner race to the thrust collar.

14. A bearing according to claim 13 wherein the thrust collar is mounted on the third portion of the inner race said third portion comprising a groove about the external surface thereof which groove allows the third portion to be deformed over at least a part of the thrust collar to retain the thrust collar on said third portion.

15. A bearing according to claim 13 wherein the external surface of the third portion of inner race is threaded to engage with a correspondingly threaded internal surface of the thrust collar, thereby allowing the thrust collar to be retained.

16. A bearing according to claim 13 wherein the second portion includes an annular step centrally located to abut against an internally extending thrust collar projection, such that the projection and the part of the second portion between the step and the first portion together define the bottom wall of the groove formed by the inner race and the thrust collar.

17. A roller having an elongate first bearing member and including a second bearing member in the form of two spaced apart annular outer races rotatably engaged one at each end thereof to define at least four bush receiving recesses, each of said spaced apart outer races having at least one internal locating means projecting inwardly thereof to at least partially separate a respective two bush receiving recesses, said conveyor roller also including a bush member locatable one in each of said bush receiving recesses each said annular bush member being adapted to dissipate heat during operation of said bearing by oscillating between a condition in which the annular bush member is stationary with respect to the first bearing member and rotatable with respect to the second bearing member and a condition in which the annular bush member is stationary with respect to the second bearing member and rotatable with respect to the first bearing member.

18. A roller according to claim 17 wherein each internal locating means is a radially inwardly directed annular flange.

19. A roller according to claim 17 wherein the elongate first bearing member includes an elongate inner race and two thrust collars, one at each end of the inner race.

20. A roller according to claim 19 wherein the each outer race is adapted to be locatable one about each end of the inner race to form a shoulder on one side of an internal locating means and a thrust collar receiving opening on the other side, such that the shoulder is in face-to-face relationship with the internal locating means to form a first bush receiving recess, and the thrust collar is locatable within the said opening to be in face-to-face relationship with the internal locating means to form a second bush receiving recess, wherein the thrust collars and inner race together define annular grooves in which each internal locating means is received.

21. A roller according to claim 20 wherein each thrust collar is connectable to that part of inner race which extends beyond the internal locating means.

22. A roller according to claim 17 wherein said roller is applied as a wheel as a surface levelling or finishing roller, or as any other form of a direct load carrying roller member in a vehicle or agricultural implement.

* * * * *